Sept. 2, 1941. W. F. HEROLD 2,254,651
CASTER MOUNTING
Filed Dec. 11, 1939

Inventor
Walter F. Herold,
By Rockwell & Bartholow
Attorneys

Patented Sept. 2, 1941

2,254,651

UNITED STATES PATENT OFFICE 2,254,651

CASTER MOUNTING

Walter F. Herold, Bridgeport, Conn., assignor to The Bassick Company, Bridgeport, Conn., a corporation of Connecticut Application December 11, 1939, Serial No. 308,567

5 Claims. (Cl. 16—29)

This invention relates to caster mountings, and it has particular reference to the provisions for creating a suitable caster pintle socket at the lower end of a sheet metal leg, such as used on washing machines, for example.

One of the objects which I have in view is the provision of a caster mounting in which the washing machine leg or furniture leg can be of U-shaped cross section or approximately U-shaped cross section, with the middle or connecting portion of the U outermost and with the caster pintle socket spaced inwardly somewhat from the outer wall of the leg so as to be in the most desirable location for a caster support.

Another object which I have in view is the provision, in a sheet metal structure which is inexpensive and which can be quickly and conveniently assembled, of a caster pintle receiving socket that is especially strong and especially resistant to deformation and distortion under heavy stresses.

To these and other ends the invention consists in the novel features and combinations of parts to be hereinafter described and claimed.

Figure 1:
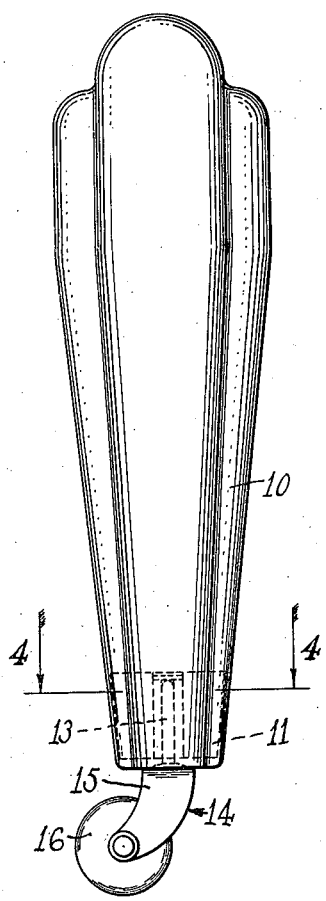
Fig. 1 is a front elevation of a washing machine leg equipped with a caster mounting of a preferred form, embodying my improvements.
Figure 2:
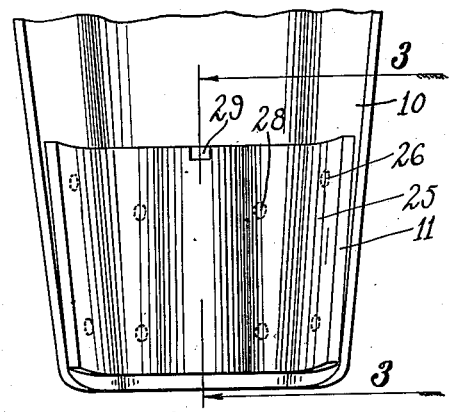
Fig. 2 is a view on a larger scale showing the lower extremity of the leg from the inner side, the caster being removed.
Figure 3:
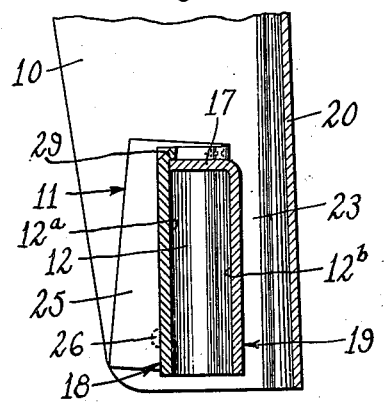
Figure 4:
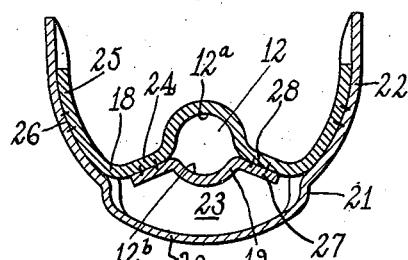
Figure 5:
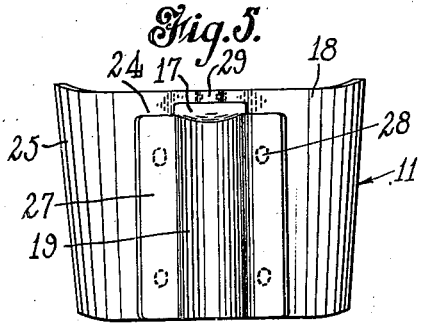
Figure 6:
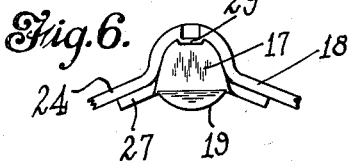

Figs. 3 and 4 are sections on lines 3—3 and 4—4 of Figs. 2 and 1, respectively;

Fig. 5 is a detail view in elevation of the sheet metal member in which the caster socket is formed, showing said member before the same is welded in place in the leg, and Fig. 6 is a fragmentary top view of the structure shown in Fig. 5 with certain parts broken away.

In the drawing I have shown my improvements as used in connection with a stamped sheet metal leg structure which is particularly adapted for use on washing machines, although it can be employed for other purposes. In the form shown, the leg 10 tapers from a large cross section at the top to a smaller cross section at the lower end, and is of approximately U-shape in cross section. Within the lower part of this leg and concealed behind the outer walls is a sheet metal caster mounting structure or pintle receiving bracket 11 which before it is applied to the leg has the appearance shown in Fig. 5, and which is adapted to be fastened within the lower end portion of the leg in a suitable manner, as by welding. This structure 11 provides a socket 12 of a shape roughly approximating a cylinder, and in the socket 12 is received the pintle or spindle 13 of a suitable caster 14 having a horn 15 and a wheel 16. The top of the socket 12 is closed by a wall 17 adapted to be abutted by the upper end of the spindle 13.

The structure 11 which provides the socket 12 is a sheet metal plate structure made up of two plates, namely, a larger plate 18 which is adapted to be welded in place in the lower part of leg 10, and a smaller plate 19 which is adapted to be fastened in a suitable manner, as by welding, to the middle portion of plate 18 in such manner as to create in conjunction with said plate 18 the socket 12 previously referred to. The upper wall 17 of the socket is an integral part of the plate 19 and is formed by bending downwardly and laterally a portion of the blank from which member 19 is made.

It will be noted that at the lower portion of leg 10, adjacent which the caster socket is provided, the walls of the leg converge somewhat in a downward direction. In the example illustrated, the profile of the leg deviates somewhat from a true U-shape in that the outer wall 20 of the leg, which is slightly concavo-convex, has shoulder portions 21 at the sides joined by slightly concavo-convex side portions or flanges 22, these side portions or flanges 22 being somewhat rearwardly divergent or flaring. However, the exact cross-sectional shape of the leg is not a matter of moment.

It will be noted from Fig. 4 that the socket for the caster spindle is located rearwardly a substantial distance from the front wall of the leg, and that the plate 19 extends crosswise with respect to the leg so as to close in, substantially, a space 23, shown in Fig. 4. The narrow plate 19 is at the front of the mounting and the wider plate 18 is at the rear.

It will be noted that the plate 18 is bent along a median line to provide a forwardly facing channel 12ª curved to provide a socket wall extending over somewhat more than a semicircle. At the sides of the channel 12ª, plate 18 is provided with lateral portions 24, which preferably are somewhat rearwardly convergent, and beyond these lateral portions the plate 18 is bent rearwardly on curves to present side portions 25 that conform to the shapes of the side portions 22 of the leg. About midway of the width of the flanges or webs 25 the latter may be secured to the respective portions 22 by spot welding, as indicated at 26 in Figs. 2 and 4.

The plate member 19 is provided at its rear face with a shallow channel 12b, and in this way plate 19 is shaped to enclose the caster spindle over somewhat less than half a circle, which thus completes the socket 12 previously referred to. The plate 19 is provided at the sides with relatively narrow portions 27 which are preferably somewhat rearwardly convergent and are positioned against the portions 24 and welded thereto by spot welding, as indicated at 28. The wall 17, previously mentioned, is provided at the upper end of plate 19, and has a curved inner edge contour, as shown in Fig. 6, so as to extend into and close the channel 12a at a point slightly below the upper edge of member 18. The inner edge of wall 17 is locked against dislocation relatively to plate 18 by being engaged under a lug 29, as best shown in Figs. 3 and 6. By preference, the lug 29, which projects in a forward direction from the bottom or back of channel portion 12a, is formed by engagement with the upper edge of plate 18 of a swaging tool which causes a small portion of the metal to be pressed forwardly in the form of a lug or projection adapted to overlie a portion of wall 17.

In manufacturing the article, it is preferred to form up and finish the plates 18 and 19, then assemble them and weld them together to provide the composite plate or bracket-like support shown in Fig. 5, and then to place the latter in the leg and weld it to the leg. In the process of manufacture, the securing of plate 19 to plate 18 in the proper relation is much facilitated by the provision of the interacting stop means between the upper edge portion of plate 18 and the inner edge of wall 17. In assembling plate 19 to plate 18 the former plate can be placed on the latter and slid lengthwise thereon until the inner edge of wall 17 takes up against lug 29, and then while in that relation the parts are welded together. The plate structure can then readily be inserted within and welded to the leg.

One of the advantages of my invention is that it provides a properly acting caster pintle socket spaced inwardly at a substantial distance from the front wall of the channeled leg structure. Another advantage arises from the great strength of the structure which enables it to stand heavy strains and hard usage. By channeling the member 18 to provide a portion of the caster socket, the strength of said member is considerably increased, and the strength of said member is also considerably increased by providing thereon the rearwardly turned approximately parallel flanges or webs. Similarly, member 19 is strengthened and stiffened by the channeling thereof to provide a portion of the caster-receiving socket. By attaching the members 18 and 19 of the bracket together at the respective sides of the pintle socket by means of contacting plate portions welded or otherwise suitably interconnected, a two-ply wall is formed at one side of the pintle socket and another at the other side thereof, this wall having considerable thickness and considerable stiffening and strengthening effect on the socket proper and on the flange structure of the leg. Moreover, the structure is also substantially reinforced by the rearwardly extended flanges provided on plate 18, which lie in contact with the inner surface of the leg over substantial areas.

It will be noted that the cross section of the channeled leg, as shown in Fig. 4, can be considerably varied without departing from the principles involved, and that the section may have a form more closely approaching a true U, or a form less similar to a true U. It will be noted that in accordance with my invention, a channeled leg is employed with a bridge member extending across from one side of the channel to the other and provided with a socket spaced inwardly from the front wall of the leg. Also preferably the bridge extending across the channel-shaped member is formed in part by a main plate having a forwardly facing channel, a smaller plate completing the formation of the socket being arranged in front of the main plate and secured to the main plate. Preferably also, as herein disclosed, the main plate has rearwardly turned flanges welded to the side walls of the channeled leg member; and preferably, also, the smaller or subsidiary plate has a channel therein which provides less than half of the caster socket. The bridge member extending across the leg not only provides a caster pintle socket but also serves as a supporting spacer or strut between the side members of the leg.

While I have disclosed one embodiment of the invention, it will be understood that it is susceptible of various embodiments, and that various changes can be made in the details within the scope of the appended claims.

What I claim is:

1. In a caster mounting for a channel-shaped leg member having a front wall and rearwardly directed side walls, the combination of a plate within said member having side flanges fastened to the side walls of the channel member and having a forwardly facing socket portion formed therein, and a plate disposed in front of said first plate and attached thereto and creating in conjunction with said first plate a complete spindle-receiving socket for a caster, said socket being spaced substantially inwardly from the front wall of the leg.

2. In a caster mounting for sheet metal leg structures, a bridge-like bracket comprising a main plate having bent-up rearwardly directed side flanges and provided at the front with an intermediate bend forming a channel, and a second plate having portions rigidly and permanently attached to said first plate at opposite sides of said channel so that said second plate is carried by the first, said second plate having a channel portion creating in conjunction with the channel portion of the first plate a complete socket for a caster spindle.

3. In a caster mounting for sheet metal leg structures of generally U-shaped cross section, a main plate having rearwardly turned attaching flanges and provided with a median depression forming a channel, said plate having flat portions at opposite sides of said channel, a second plate having a channel facing said first-named channel, said second plate having flat portions opposing said first-named flat portions and welded thereto, one of said plates having an inturned wall acting as the bottom member of a caster pintle socket defined by said channels in conjunction, and the other plate having a stop lug engaged by the edge portion of said inturned wall.

4. In a caster mounting for a sheet metal leg structure having a concavo-convex front wall and rearwardly flaring concavo-convex side walls joined to said front wall by shoulder portions, the combination of a sheet metal plate having rearwardly turned flanges contacting the inner surfaces of said side walls and welded thereto, said plate having a portion extending across the leg structure from locations adjacent said shoulder portions and provided with a median depression constituting a portion of a spindle socket for a caster, a front plate having a shallow channel portion opposing said first-named channel portion and completing the socket for the caster spindle, said second plate having flanges lying against and welded to portions of the first plate at opposite sides of said socket.

5. In a caster mounting for a sheet metal leg structure having a concavo-convex front wall and flaring concavo-convex side walls joined to said front wall by shoulder portions, the combination of a sheet metal plate having rearwardly turned flanges contacting the inner surfaces of said side walls and welded thereto, said plate having somewhat rearwardly convergent portions extending inwardly from the vicinity of said shoulder portions, and said plate being further provided with a median depression between said convergent portions constituting a part of a spindle socket for a caster, said part being larger than a half circle, a front plate spaced rearwardly from the front wall of the leg and having a shallow channel portion opposing said first-named channel portion and completing the socket for the caster spindle, said second plate having somewhat rearwardly convergent flanges lying against and welded to portions of the first plate at opposite sides of said socket.

WALTER F. HEROLD.